US010437410B2

(12) United States Patent
Yang et al.

(10) Patent No.: US 10,437,410 B2
(45) Date of Patent: Oct. 8, 2019

(54) CONVERSATION SUB-WINDOW

(71) Applicant: Cisco Technology, Inc., San Jose, CA (US)

(72) Inventors: Mingfeng Yang, Hefei (CN); Yasi Xi, Hefei (CN); Barry Jia, Hefei (CN); David You, Hefei (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 535 days.

(21) Appl. No.: 15/086,097

(22) Filed: Mar. 31, 2016

(65) Prior Publication Data

US 2017/0285880 A1    Oct. 5, 2017

(51) Int. Cl.
| | | |
|---|---|---|
| *G06F 3/0481* | (2013.01) | |
| *G06F 3/0488* | (2013.01) | |
| *G06F 3/0486* | (2013.01) | |
| *G06F 3/0484* | (2013.01) | |
| *H04L 12/58* | (2006.01) | |

(52) U.S. Cl.
CPC .......... *G06F 3/0481* (2013.01); *G06F 3/0486* (2013.01); *G06F 3/0488* (2013.01); *G06F 3/04842* (2013.01); *H04L 51/04* (2013.01); *H04L 51/16* (2013.01)

(58) Field of Classification Search
CPC .................................................. G06F 3/0481
USPC ......................................................... 715/753
See application file for complete search history.

(56) References Cited

U.S. PATENT DOCUMENTS

| | | | |
|---|---|---|---|
| 8,433,759 B2 | 4/2013 | Styles et al. | |
| 8,594,292 B1* | 11/2013 | Moore | H04M 3/42042 379/201.01 |
| 8,849,356 B2 | 9/2014 | Chi et al. | |
| 2006/0055662 A1 | 3/2006 | Rimas-Ribikauskas et al. | |
| 2010/0217808 A1* | 8/2010 | Benninger | H04L 51/04 709/206 |
| 2011/0029892 A1* | 2/2011 | Kurtz | G06Q 10/107 715/752 |
| 2015/0200879 A1 | 7/2015 | Wu et al. | |
| 2017/0235739 A1* | 8/2017 | Yang | G06F 16/447 715/784 |

OTHER PUBLICATIONS

Proto.io Spaces; "Animation to profile interactive prototype", 2015; available on the web at: https://spaces.proto.io/project/0F7679AA-A359-72C4-86BE-B1EF3EE8D8E3/Animation-to-profile/.

* cited by examiner

*Primary Examiner* — William D Titcomb
(74) *Attorney, Agent, or Firm* — Polsinelli PC (57) ABSTRACT

A method for following specific participants from among participants of a group conversation over a communications network is implemented on a computing device and includes: presenting participant posts from the participants of a group conversation in an application window, detecting at least one request to follow at least one of the specific participants as a followed participant, and presenting the participant posts associated with at least one followed participant in an application sub-window.

20 Claims, 9 Drawing Sheets

CONVERSATION SUB-WINDOW

FIELD OF THE INVENTION

The present invention generally relates to presenting an ongoing conversation in a collaborative environment.

BACKGROUND OF THE INVENTION

Instant messaging (IM) and collaboration applications provide real-time text communication, often called "posts" or "chats", between two or more participants, thereby supporting a "conversation" between the participants over a communications network, such as, for example, the Internet. Such applications often support maintaining the continuity of an ongoing conversation between its participants by saving the communications as they are sent as a conversation's "history". Some or all of the conversation's history may be presented or made accessible to the participants when accessing a given conversation. Presentation of the conversation's history is typically in reverse chronological order, where the most recent posts are presented first.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method for following specific participants from among participants of a group conversation over a communications network is implemented on a computing device and includes: presenting participant posts from the participants of a group conversation in an application window, detecting at least one request to follow at least one of the specific participants as a followed participant, and presenting the participant posts associated with at least one followed participant in an application sub-window.

A method for processing an avatar flick UI gesture includes: detecting a finger press on a location of a touchscreen associated with a participant avatar, where the participant avatar is associated with a participant of a group conversation over a communications network, detecting the finger press progressing to a flicking motion from the location of a touchscreen, and in accordance with the flicking motion, changing a status for the participant within said group conversation.

Detailed Description of Example Embodiments

It will be appreciated that collaboration applications, such as, for example, Cisco Spark, may support the participation of hundreds (or even more) participants in a given group conversation. It will also be appreciated that in such an environment, practically speaking, posts by some of the participants may be "more important" or at least of greater interest than posts by some other participants. For example, in a typical scenario of a group conversation between members of a single company department, it's not uncommon that a participant will take special care to read the posts of his/her direct superior and/or the department manager. However, in a large group conversation, with hundreds of participants, it may be difficult to find or highlight posts from a specific participant or group of participants.

In accordance with embodiments described herein, locating the posts by a specific participant or group of participants from within a group conversation's population of posts may be accomplished by selecting a participant or group of participants to follow or track separately within the conversation, and opening a conversation sub-window where posts by the "followed" participant(s) are presented separately. It will be appreciated by one of ordinary skill in the art that such a sub-window may be a dedicated area of an application display screen or a separate popup window that may be displayed either instead of, or in parallel with, the application display screen. It will be similarly appreciated that the particular implementation chosen may be, at least in part, a function operating system capabilities.

Figure 1:
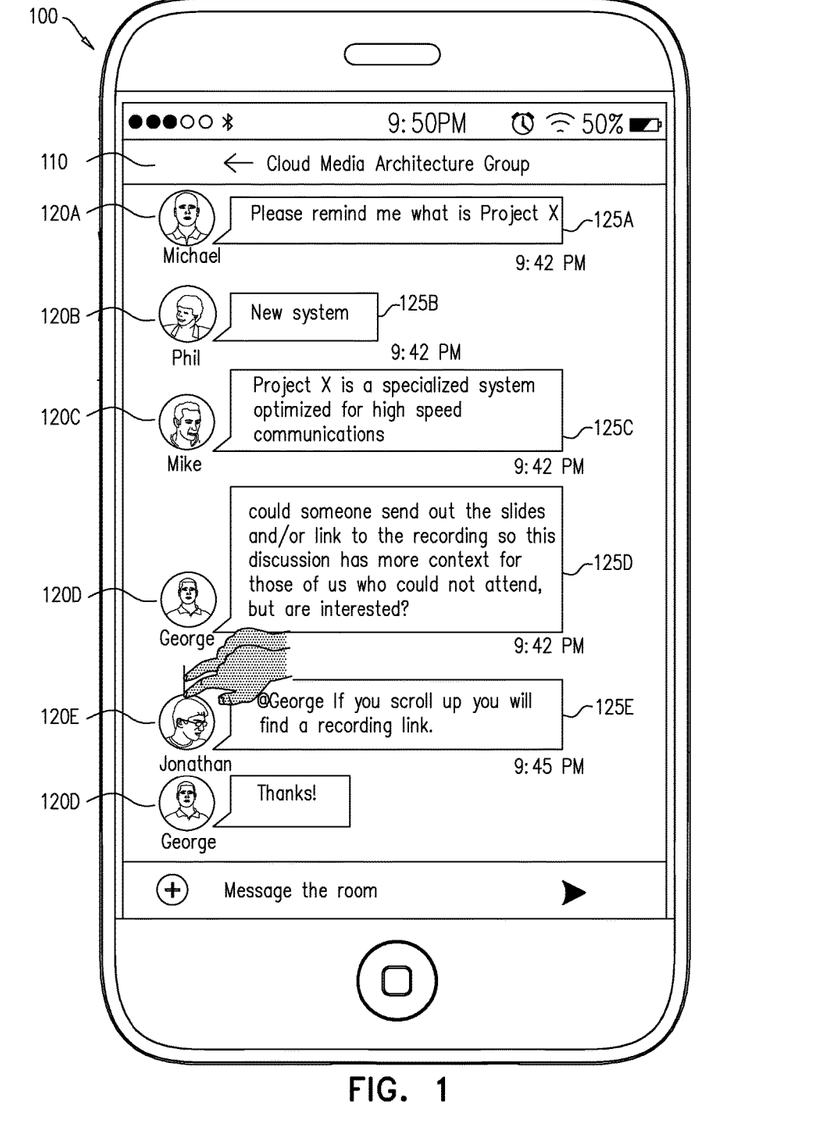
FIG. 1 is a simplified pictorial illustration of a display of an exemplary collaboration application, constructed and operative in accordance with embodiments described herein.

Reference is now made to FIG. 1 which is a simplified pictorial illustration of an exemplary collaboration application display 100, constructed and operative in accordance with embodiments described herein. Display 100 comprises conversation label 110, participant avatars 120, and participant posts 125. Accordingly, as depicted in FIG. 1, display 100 may represent a group conversation of the "Cloud Media Architecture Group" (per conversation 110). Participant avatar 120A indicates the participation of a participant named "Michael" that has posted participant post 125A. Similarly, participant avatar 120B indicates the participation of a participant named "Phil" that has posted participant post 125B; participant avatar 120C indicates the participation of a participant named "Mike" that has posted participant post 125C; participant avatar 120D indicates the participation of a participant named "George" that has posted participant post 125D; and participant avatar 120E indicates the participation of a participant named "Jonathan" that has posted participant post 125E. It will be appreciated that the presentation of participation avatars 120 and posts 125 may be in reverse chronological order where the most recent posts are displayed and scrolling upwards progressively reveals older posts, thereby representing the most recent contributions to the ongoing conversation of the Cloud Media Architecture Group.

In accordance with an exemplary embodiment of the present invention, the user of the device in FIG. 1, may which to specifically view the posts from the participant named Jonathan. In order to do so, the user may use a user interface (UI) gesture on the associated participant avatar, i.e., participant avatar 120E. For example, as depicted in FIG. 1, the user may place a finger on participant avatar 120E and "flick" it upwards, to seemingly indicate the associated participant posts 125 (i.e., participant posts 125E) should be copied to a sub-window somewhere higher in display 100.

In accordance with embodiments described herein, an avatar flick UI gesture may be implemented by the user tapping on a participant avatar 120 and continuing to hold the tapping gesture for at least a pre-defined period of time, i.e., a finger press. Once the pre-defined period of time passes, a sub-window may be displayed and/or highlighted on display 100. Once the sub-window is opened and/or highlighted, the avatar flick option may be activated: the user may then flick the activated participant avatar 120 into the sub-window, i.e., the finger press may progress to a flick motion. It will be appreciated that generally similar methodology may be used to implement a reverse avatar flick to remove participant avatar 120 from the sub-window. It will similarly be understood that the avatar flick UI gesture as described herein may be exemplary; the embodiments described herein may support the use of other UI gestures to enable a user to follow specific participants in a conversation. It will also be understood that the location of the sub-window, e.g., bottom, top or side of the display screen may be configurable.

Figure 2:
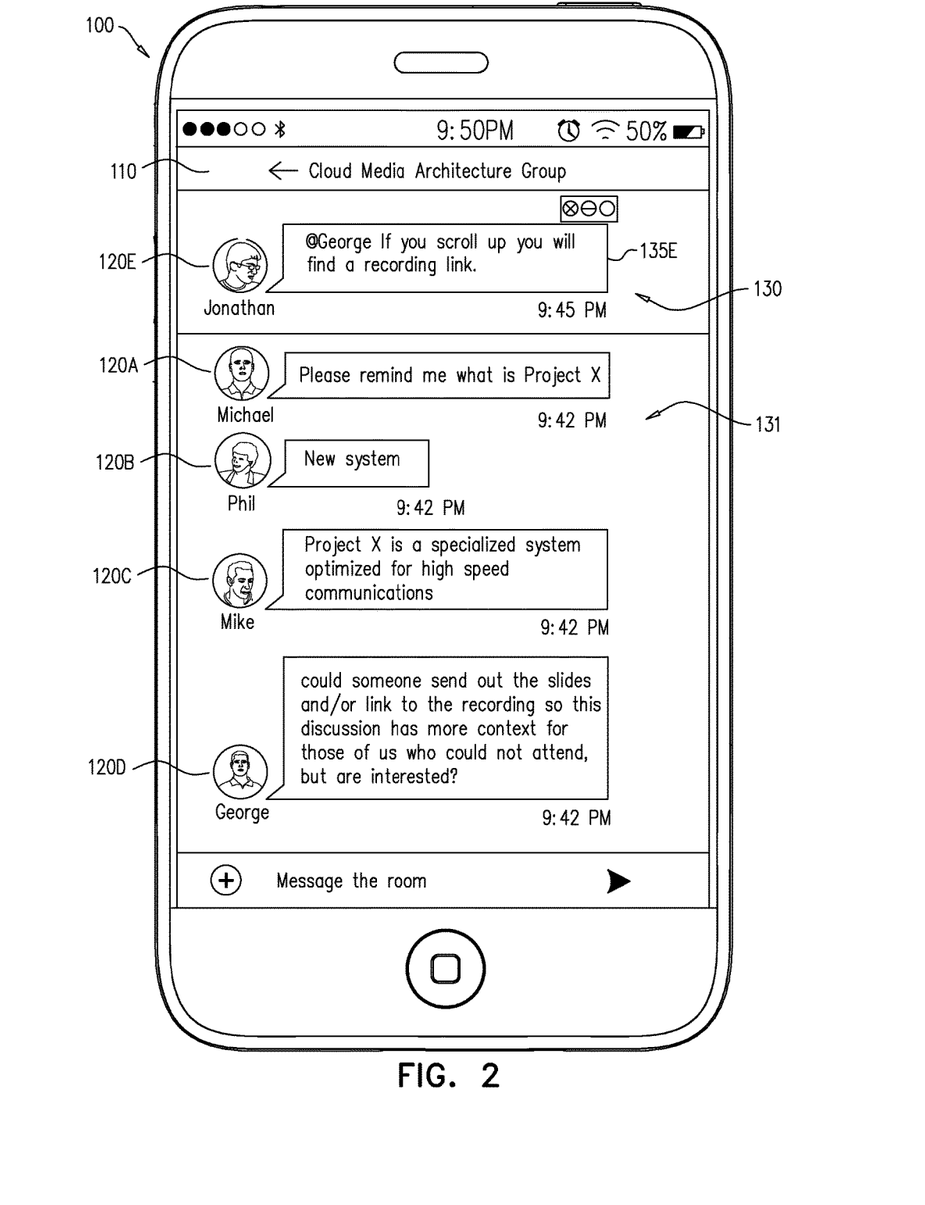
FIGS. 2-4 are simplified pictorial illustrations of additional displays of the exemplary collaboration application of FIG. 1.

Reference is now made to FIG. 2, which illustrates the result of the UI gesture depicted in FIG. 1. Similar reference numerals refer to similar elements. It will be appreciated that display 100 now comprises sub-window 130 and main window 131, whereas in FIG. 1 the conversation was displayed in a single window. Sub-window 130 may comprise copies of participant posts 125 (FIG. 1) that are associated with participants whose participant avatars 120 have been selected as described hereinabove. Accordingly, participant post 135E is a copy of participant post 125E and is associated with participant avatar 120E, i.e., participant Jonathan. It will be appreciated that display 100 may support scrolling through both sub-window 130 and main window 131. Accordingly, there may be other participant posts 135 (not shown in FIG. 2) associated with participant avatar 120E that may be accessible by scrolling through the contents of sub-window 130. It will similarly be appreciated that participant post 125E (FIG. 1) may not have been removed from main window 131—copying participant posts 125 from main window 131 to participant posts 135 in sub-window may not affect the contents of main window 131.

In accordance with embodiments described herein, the user may navigate to a point in main window 131 according to input in sub-window 130. For example, by double tapping or double clicking on a given participant post 135 in sub-window 130, the display in main window 131 to focus on the corresponding participant post 125 in main window 131, i.e., to adjust the display to present at least the corresponding participant post 125. It will be appreciated that the specific UI gesture used for such navigation may be configurable.

Figure 3:
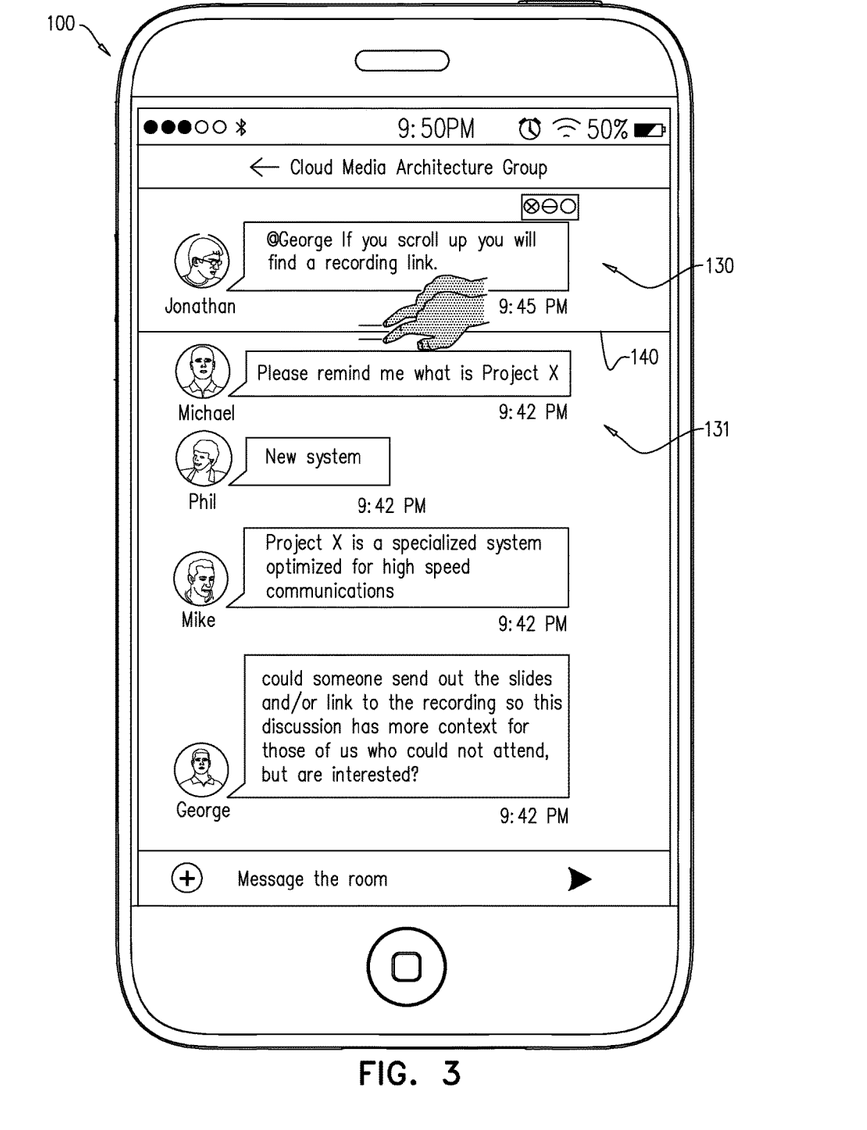

Reference is now made to FIG. 3. It will be appreciated that display 100 may support the resizing of sub-window 130 and main window 131. For example, the user of display 100 may wish to allocate more room to viewing participant posts 135 associated with participant Jonathan. The user may resize windows 130 and 131 using known means for windows resizing. For example, as illustrated in FIG. 3, the user may press and drag window divider 140 upwards or downwards to resize the relative allocation of sub-window 130 vis-à-vis main window 131.

Figure 4:
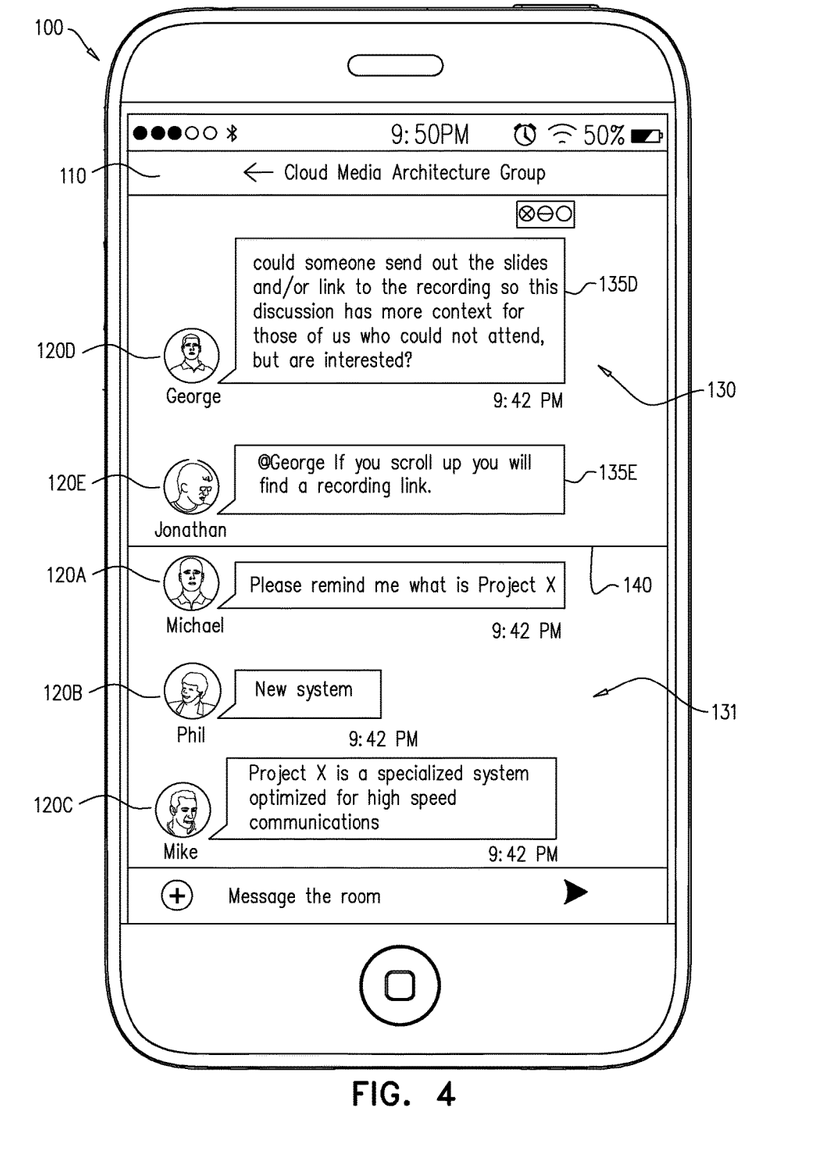

It will be appreciated that the user may add more than one participant avatar 120 (FIG. 1) to sub-window 130 using the method described hereinabove. FIG. 4, to which reference is now made, illustrates an exemplary display 100 after participant avatar 120D has also been selected for inclusion in sub-window 130 after the resizing of windows depicted in FIG. 3. Participant post 135D, associated with participant George, may now also be displayed in sub-window 130 in addition to participant post 135E.

It will be appreciated by one of ordinary skill in the art, that in the exemplary embodiments of FIGS. 1-4, the computing device on which display 100 is depicted may generally represent a smartphone. However, it will be appreciated that the embodiments described herein may not be limited to implementation on a smartphone. Display 100 may be implemented on any suitable computing device such as, for example, a smartphone, a computer tablet, or a personal computer.

Figure 5:
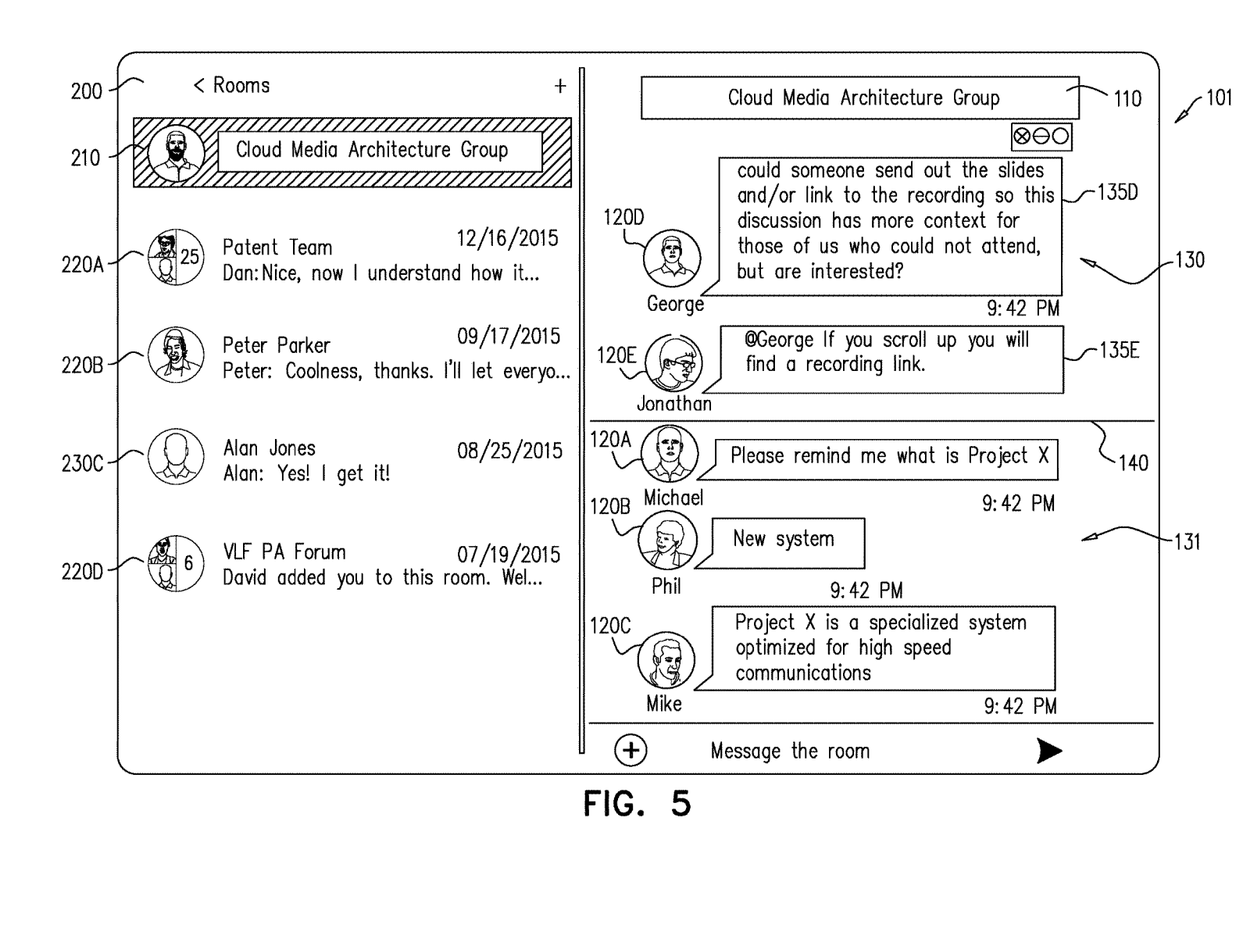
FIGS. 5-7 are simplified pictorial illustrations of alternative displays of the exemplary collaboration application of FIG. 1.

For example, FIG. 5, to which reference is now made, may depict display 101, an exemplary version of display 100 as it may be implemented on a larger device (relative to the device of FIGS. 1-4), such as a computer tablet. Similar reference numerals may refer to similar elements. In accordance with the exemplary embodiment of FIG. 5, display 101 may therefore comprise not only sub-window 130 and main window 131 as depicted in FIGS. 1-4, but also column 200, entitled "Rooms" with a list of conversations or "rooms" to which the user of display 101 may belong, where current room avatar 210 may indicate a currently "in focus" conversation, and non-current room avatars 220 may indicate conversations that are not currently in focus.

For example, current room avatar 210 may be highlighted to indicate that the room for the "Cloud Media Architecture Group" is currently "in focus", i.e., current room avatar 210 may be associated with the current room displayed in windows 130 and 131. Non-current room avatars 220 may be associated with other conversations of which the user of display 101 is also a participant. Display 101 may be configured to enable the user to use a UI gesture to switch the focus, i.e., to replace the conversation associated with current room avatar 210 with a conversation associated with one of non-current room avatars 220. For example, the user may use a UI gesture such as, for example, a double tap on non-current room avatar 220A to select the conversation for "Patent Team" to be placed in focus. Similar UI gestures may be used to select the conversations associated with non-current room avatars 220B ("Peter Parker"), 220C ("Alan Jones") and/or 220D ("VLF PA Forum"). It will be appreciated that the use of a double tap may be exemplary; the embodiments described herein may support the use of any suitable UI gesture and/or other means known in the art to input the described selection of a non-current room avatar 220. For example, a non-current room avatar 220 may be "dragged and dropped" to window 131. Non touchscreen utilities such as, for example, menu selections and/or mouse clicks may also be used.

Figure 6:
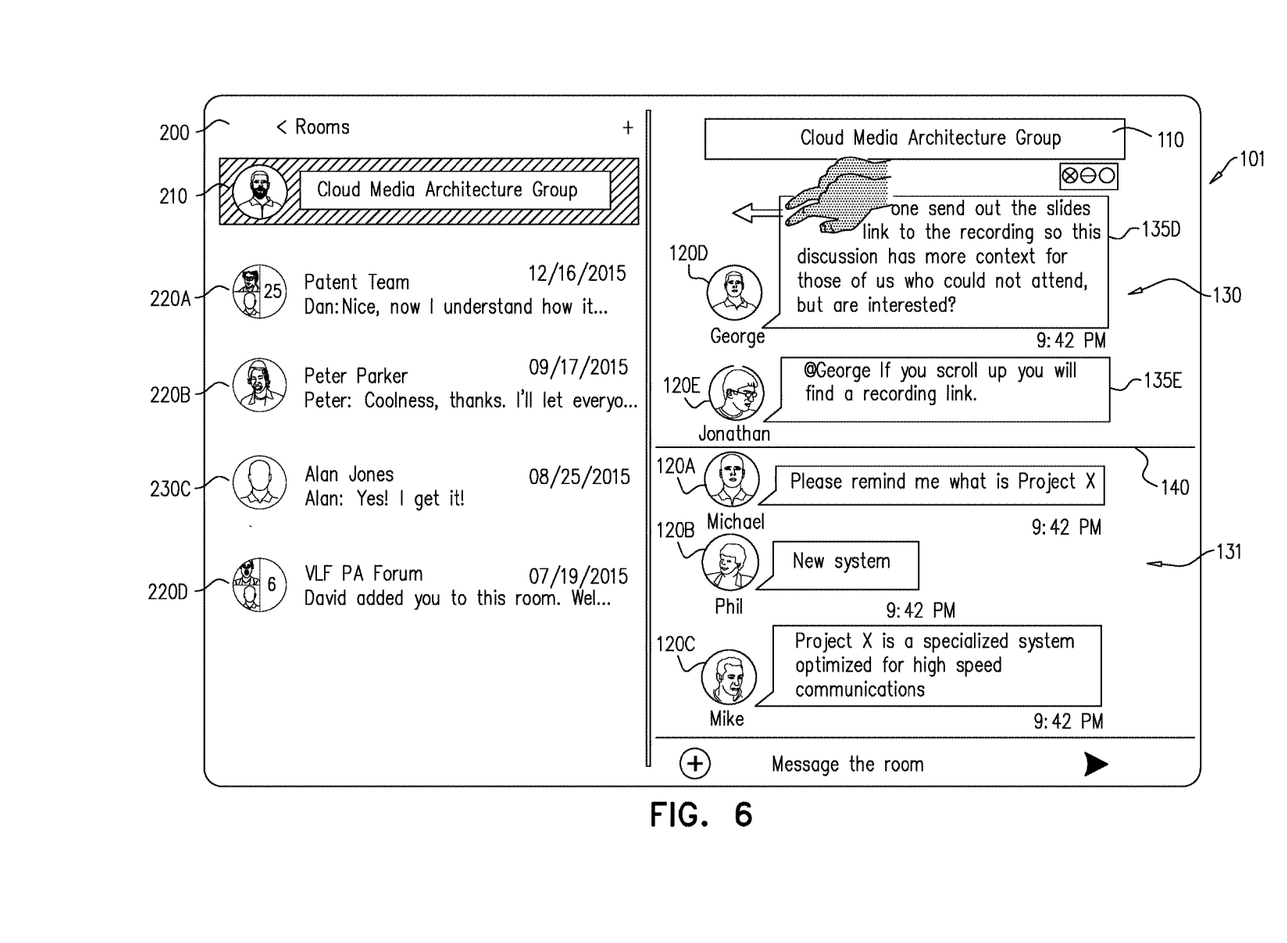

Reference is now made to FIG. 6 which illustrates another exemplary embodiment of display 101. It will be appreciated that the user of display 101 may wish to generate a new conversation based on the participants associated with sub-window 130, i.e., as per the exemplary embodiment of FIG. 6, George and Jonathan. As depicted in FIG. 6, the user may enter a drag UI in the area of sub-window 130 in the direction of rooms column 200 to generate a new conversation with the participants associated with sub-window 130.

Figure 7:
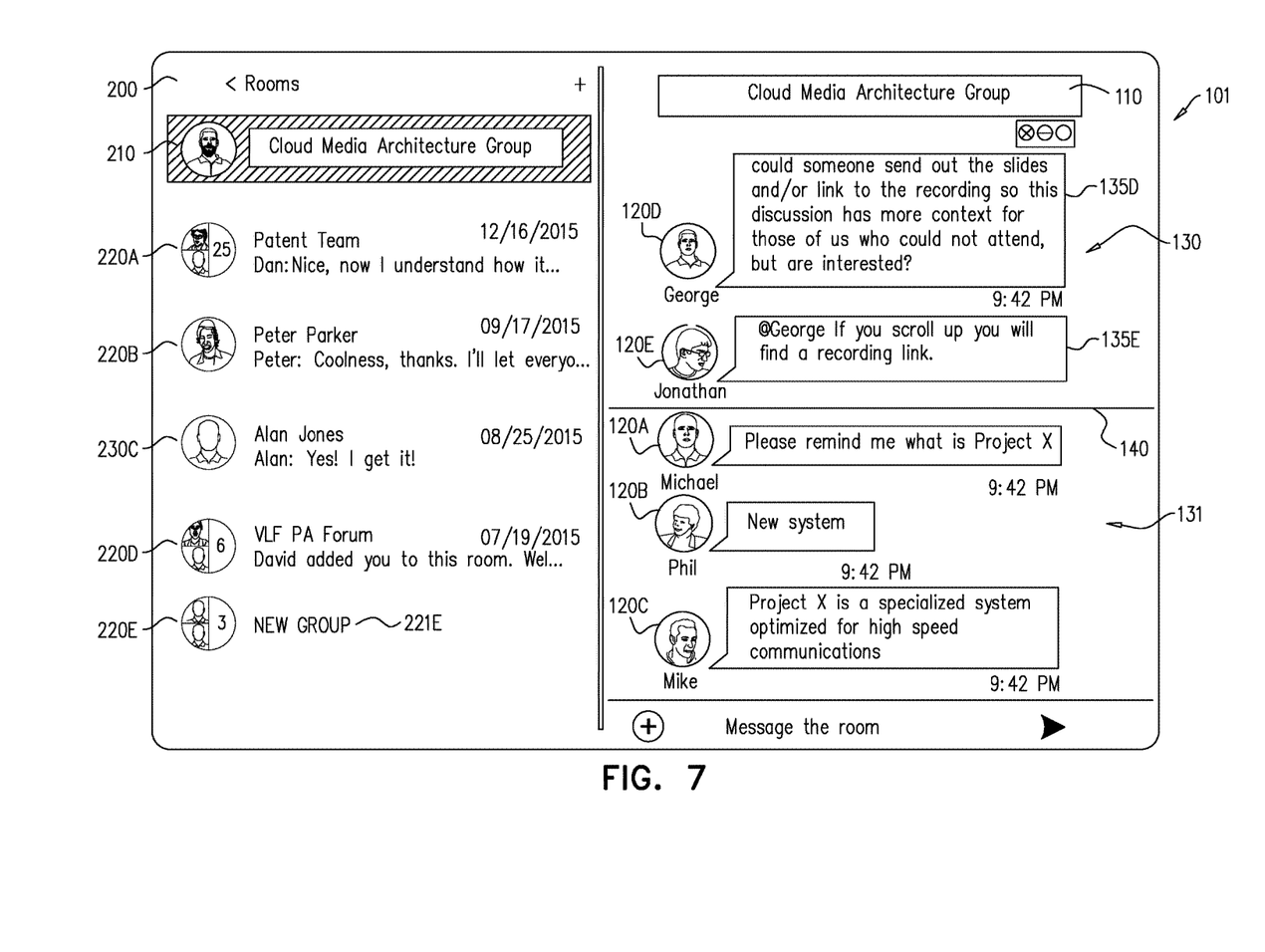

Reference is now made to FIG. 7 which illustrates an exemplary result of the UI gesture of FIG. 6. Non-current room avatar 220E may be associated with a new conversation with a temporary name 221E ("New Group"). It will be appreciated that once created, the New Group conversation may continue independently of its "parent" conversation, i.e., the Cloud Media Architecture Group conversation as per conversation label 110.

Figure 8:
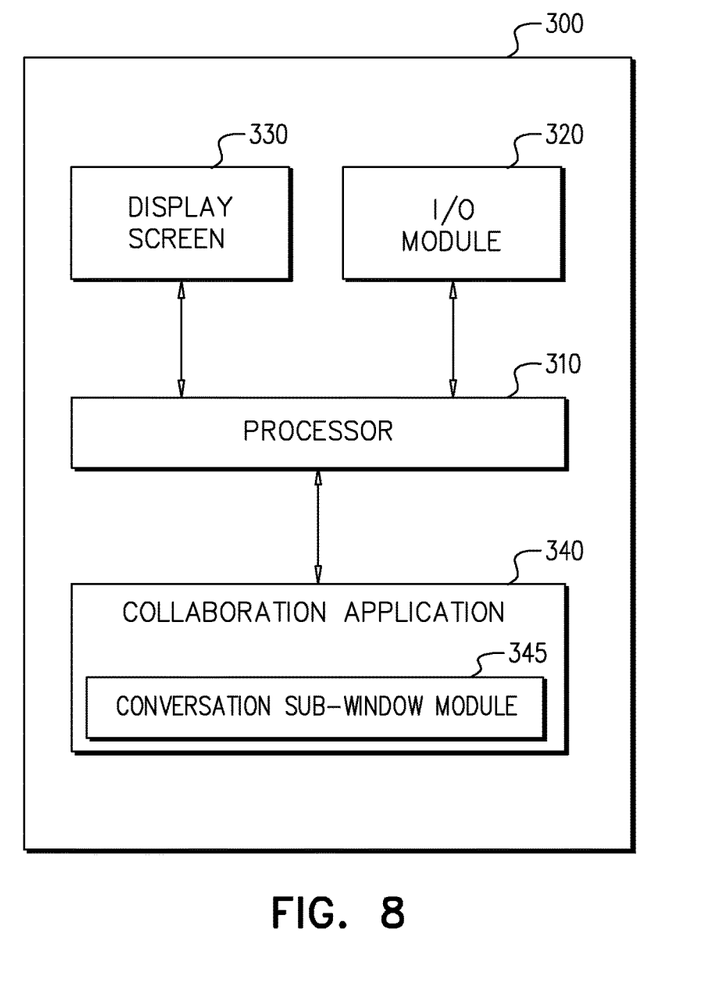
FIG. 8 is a block diagram of a computing device operative to run the exemplary collaboration application of FIG. 1.

Reference is now made to FIG. 8 which is a block diagram of a computing device 300 constructed and operative in accordance with embodiments described herein to provide an exemplary collaboration application configured to present displays 100/101 as described with respect to FIGS. 1-7. Computing device 300 may be implemented as any suitable computing device such as, but not limited to, a personal computer, laptop computer, computer tablet, or smartphone that may be operative to provide the functionality described hereinabove with reference to FIGS. 1-7.

It will be appreciated by one of skill in the art that computing device 300 comprises hardware and software components that may provide at least the functionality of the embodiments described herein. For example, computing device 400 may comprise at least processor 310, I/O module 320, display screen 330, and collaboration application 340. I/O module 320 may be implemented as a transceiver or similar means suitable for transmitting and receiving data between computing device 300 and another device. Such data may be, for example, participant posts 125 (FIG. 1). In accordance with some embodiments described herein, display screen 330 may be implemented as a touchscreen to detect the direct input of UI gestures, however, as noted hereinabove, menu selections and/or mouse clicks may be used to compensate for a lack of touchscreen functionality. It will be appreciated that display screen 330 may be implemented as a built-in integrated component of computing device 300, or alternatively as an attached peripheral device.

Collaboration application 340 may be any suitable application implemented in software and/or hardware that may be operative to facilitate a user's ongoing participation in a conversation as described hereinabove. For example, collaboration application 340 may be implemented as Cisco Spark®. It will, however, be appreciated that collaboration 340 may be implemented as any suitable IM, collaboration, and/or social network application that supports ongoing conversations between multiple participants, such as, for example, Jabber®, WhatsApp®, or Facebook®.

It will be appreciated that computing device 300 may comprise more than one processor 310. For example, one such processor 310 may be a special purpose processor operative to execute collaboration application 340. Client application 340 comprises conversation sub-window module 345. Conversation sub-window module 345 may be implemented in software and/or hardware and may be employed as necessary by collaboration application 340 to derive and present visual representations of a conversation's timeline based on communications transmitted/received by collaboration application 340, typically via I/O module 320. It will be appreciated by one of ordinary skill in the art that some or all of the functionality of conversation sub-window module 345 may be implemented on a collaboration server (not shown) that may be configured to facilitate collaborative communications between collaboration applications 340 on different computing devices 300. For example, the collaboration server may store some or all of the conversation history displayed in sub-window 130 or main window 131 as described hereinabove. The application server may also perform indexing of the conversation in order to provide participation posts 125 and/or 135 for display by collaboration application 340 and/or conversation sub-window module 345.

Figure 9:
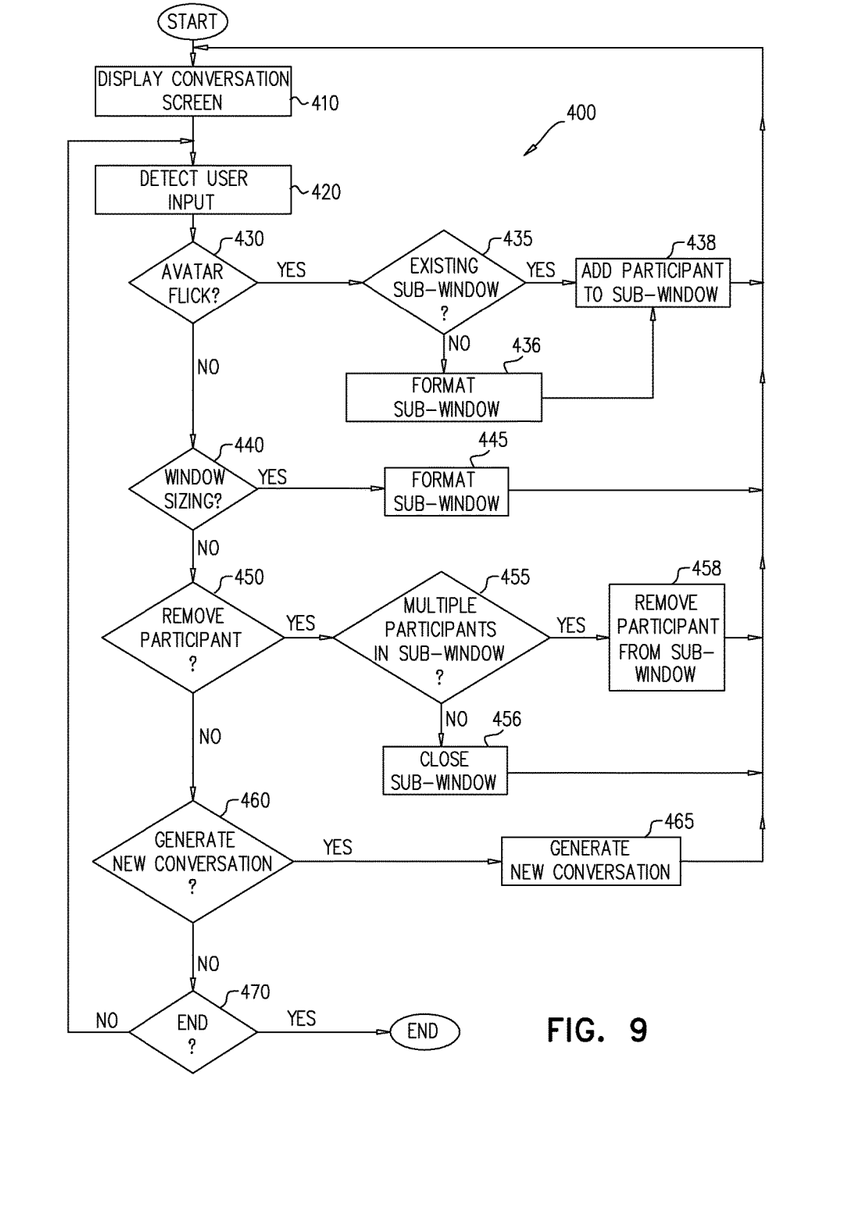
FIG. 9 is a flowchart of an exemplary conversation sub-window process to be executed on the computing device of FIG. 8 within the context of the exemplary collaboration application of FIGS. 1-7.

Reference is now made to FIG. 9 which illustrates a conversation sub-window process 400, constructed and operative in accordance with embodiments described herein. Process 400 may be used by collaboration application 340 to generate and/or manage sub-windows for an ongoing conversation. Collaboration application 340 may generate (step 410) and present on display screen 430 a representation of a conversation, such as displays 100 or 101 from FIGS. 1-7.

Collaboration application 340 may detect (step 420) a UI gesture input by the user of display 100/101. It will be appreciated that process 400 may be configured to detect and recognize any suitable UI gesture, or combination of UI gestures (step 420). Non-limiting examples of such UI gestures may include: an avatar flick, a sliding finger, tap, double tap, menu selection, mouse click, or double click. It will be appreciated that in addition to the functionality described hereinabove for the operation of conversation sub-windows 130, collaboration application 340 may be operative to process a variety of UI gestures in order to present and execute displays 100/101. As such, non-limiting examples of UI gestures detected in step 420 may include: an avatar flick, a sliding finger, tap, double tap, menu selection, mouse click, or double click. In any case, it will be appreciated that the following description of process 400 may address the processing of UI gestures that may be concerned with the presentation and operation of conversation sub-windows 130.

Accordingly, if the UI gesture is an avatar flick or any other suitable UI gesture configured to indicate a request to add a participant to a sub-window 130 for the current conversation, (step 430), client application 340 may invoke conversation sub-window module 345 to continue processing the request.

Conversation sub-window module 345 may check if sub-window 130 is already open (step 435), i.e., if a previous participant is already being followed as described hereinabove. If sub-window 130 is already open (step 438), conversation sub-window module 345 may add the indicated participant (according to the selected avatar) to sub-window 130 and indicate the associated participant posts 125 to be displayed as participant posts 135 in sub-window 130. Process control may then return to step 410 where display 100/101 is displayed, or at least refreshed to include sub-window 130.

If sub-window 130 is not already open (step 436), conversation sub-window module 345 may format (step 436) a sub-window 130, i.e., allot an area of display 100/101 for the placement of sub-window 130, determine which participant posts 125 remain on display in main window 131, etc. It will be appreciated that the actual format of sub-window 130 may be a function of the size of display screen 330 and/or the overall configuration of computing device 300. Similarly, in accordance with some embodiments, sub-window 130 may be defined as a separate window. For example, if computing device 300 is a standard personal computer using an operating systems such as, for example, Microsoft Windows®, sub-window 130 may be formatted to open as a separate window from display 100/101. Process 400 may then continue with step 438 and the process flow may continue as described hereinabove.

If the UI gesture is not a request to add a participant to sub-window 130 for the current conversation, (step 430), collaboration application 340 may determine whether the UI gesture represents a request to resize sub-window 130 (step 440), such as depicted in FIG. 3. If the UI gesture does represents a request to resize sub-window 130, client application 340 may invoke conversation sub-window module 345 to format (step 445) sub-window 130, in accordance with the request. Process control may then return to step 410 where display 100/101 is displayed, or at least refreshed to present a resized display of sub-window 130.

If the UI gesture is not a request to resize sub-window 130 (step 440), client application 340 may determine whether the UI gesture represents a request to remove (step 450) a participant from sub-window 130. For example, in accordance with embodiments described herein, a "reverse avatar flick" may be used to "un-follow" a participant, i.e., remove a participant from sub-window 130. A reverse avatar flick may be performed in generally the opposite manner of the avatar flick gesture described hereinabove. For example, by pressing a finger on a participant avatar 120 and flicking it downwards. It will be appreciated that other UI gestures and/or menu options may also be configured to indicate a request to un-follow a participant.

If the UI gesture represents a request to remove a participant from sub-window 130 for the current conversation, (step 450), client application 340 may invoke conversation sub-window module 345 to continue processing the request. Conversation sub-window module 345 may check if there are multiple participants being followed in sub-window 130 (step 455). If there are multiple participants such that sub-window 130 should remain open after removal of the indicated participant, conversation sub-window module 345 may remove (step 458) the indicated participant (according to the selected avatar) from sub-window 130. Process control may then return to step 410 where display 100/101 is displayed, or at least refreshed to present sub-window 130 without participant posts 135 associated with the now removed participant.

If there are not multiple participants being followed in sub-window 130 (step 455), i.e., the only participant being followed is the participant currently selected for removal, conversation sub-window module 345 may close (step 456) sub-window 130, i.e., reformat display 100/101 without sub-window 130, generally as depicted in FIG. 1. Process control may then return to step 410 where display 100/101 is displayed, or at least refreshed to present participant posts 125 without dividing the presentation between sub-window 130 and main window 131.

If the UI gesture represents a request to generate a new conversation (step 460) as described with respect to the embodiments of FIGS. 6 and 7, collaboration application 340 may generate (step 465) a new conversation between the user of display 100/101 and the participants followed in sub-window 130. Process control may then return to step 410 where display 100/101 is displayed. It will be appreciated that the nature in which the new conversation is presented (if at all) vis-à-vis sub-window 130 and main window 131 within display 100/101, may be a function of the size of computing device 300. There may, or may not, be enough room on display screen 330 to show a not in focus conversation room alongside windows 130 and 131.

It will be appreciated by those of ordinary skill in the art that collaboration application 340 may be implemented with additional functionality for initializing the new conversation. For example, in accordance with some embodiments described herein, the new conversation may be set up as a continuation of the previous conversation, such that the associated participation posts 135 may be copied from sub-window 130 into the new conversation as participation posts 125. Alternatively, collaboration application 340 may be configured to set up the new conversation without copying over participation posts 135. Collaboration application 340 may also be configured to place the new conversation in focus.

If the UI gesture represents a request to end (step 470), process 400 may end, and a next process may be performed. It will be appreciated that any suitable UI input may be configured to represent a request to end the process. For example, depending on the operating system and/or the presence of a touchscreen, mouse and/or keyboard, a request to end may be input via tapping an "end" button, a mouse click on a window close symbol (typically, although not necessarily an "X"), an ALT-F4 keystroke combination, selecting an application exit menu option, etc.

Otherwise, if the UI gesture cannot be parsed, control may return to step 420. It will be appreciated that process 400 may also support other functionality that in the interests of clarity has not been specifically detailed herein. For example, the user input detected in step 420 may represent known functionality for scrolling as discussed hereinabove. It will therefore be appreciated that process 400 may also support receiving a scrolling request and adjusting/redisplaying the affected elements as necessary.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for following specific participants from among participants of a group conversation over a communications network, the method implemented on a computing device and comprising:
   first displaying participant posts from said participants of a group conversation in an application window on a display;
   detecting selection, from the group conversation in the application window, of at least one of the participants; and
   second displaying participant posts of the group conversation of the selected at least one participant in an application sub-window without including participant posts of the participants that were not selected during the selecting, such that the sub-window represents a portion of the group conversation of the application window;
   wherein the second displaying occurs during the first displaying such that the application window and sub-window appear simultaneously on the display.

2. The method according to claim 1 and wherein said detecting selection comprises:
   detecting a finger press on a screen location for a participant avatar associated with said one of said specific participants; and
   detecting an flick motion from said screen location in a direction of said sub-window.

3. The method according to claim 2 and wherein said detecting a request further comprises:
at least one of opening or highlighting said sub-window in response to said detecting a finger press.

4. The method according to claim 1 and wherein:
said detecting comprises detecting at least two said requests to follow at least two of said specific participants as said followed participants; and
said second displaying comprises presenting said participant posts associated with said at least two followed participant in said sub-window.

5. The method according to claim 1 and further comprising:
detecting a request to stop following said at least one participant;
determining a participant to stop following based on said request to stop following; and
removing said participant posts associated with said participant to stop following from said sub-window.

6. The method according to claim 1 and wherein said detecting a request to stop following comprises:
detecting a finger press on a screen location for a participant avatar associated with said one of said specific participants in said sub-window; and
detecting an outward flick motion from said screen location in said sub-window.

7. The method according to claim 1 and further comprising:
detecting a request to resize said sub-window;
resizing said sub-window in accordance with said request to resize; and
presenting said participant posts in said resized sub-window.

8. The method according to claim 1 and further comprising:
detecting a request to generate a second group conversation with at least said followed participant; and
generating said second group conversation between said at least one participant and a user of said computing device.

9. The method according to claim 8 and wherein said detecting a request to generate comprises:
detecting at least a finger press on a screen location associated with said sub-window; and
detecting a drag motion in a direction of an indication of a list of said group conversations.

10. The method according to claim 1 and also comprising:
navigating within said participant posts in said application window in accordance with an indicated participant post in said sub-window.

11. The method according to claim 10 and wherein said navigating comprises:
detecting selection of said indicated participant post in said sub-window;
adjusting a focus in said application window in accordance with said participant post in said application window corresponding to said indicated participant post; and
representing said participant posts from said participants of said group conversation in said application window in accordance with said adjusted focus.

12. The method according to claim 11 and wherein said detecting selection comprises:
detecting a double tap on said participant post.

13. An apparatus, comprising:
a display;
a processor;
a memory storing instructions which when executed by a processor cause the processor to perform operations, comprising:
first displaying participant posts from said participants of a group conversation in an application window on the display;
detecting selection, from the group conversation in the application window, of at least one of the participants; and
second displaying participant posts of the group conversation of the selected at least one participant in an application sub-window without including participant posts of the participants that were not selected during the selecting, such that the sub-window represents a portion of the group conversation of the application window;
wherein the second displaying occurs during the first displaying such that the application window and sub-window appear simultaneously on the display.

14. The apparatus of according to claim 13, the operations further comprising:
detecting a request to generate a second group conversation with at least said followed participant; and
generating said second group conversation between said at least one participant and a user of the apparatus.

15. The apparatus of according to claim 14, and wherein said detecting a request to generate comprises:
detecting at least a finger press on a screen location associated with said sub-window; and
detecting a drag motion in a direction of an indication of a list of said group conversations.

16. The apparatus according to claim 13, the operations further comprising:
navigating within said participant posts in said application window in accordance with an indicated participant post in said sub-window.

17. A non-transitory computer readable media storing instructions which when executed by a processor cause the processor to perform operations comprising:
first displaying participant posts from said participants of a group conversation in an application window on a display;
detecting selection, from the group conversation in the application window, of at least one of the participants; and
second displaying participant posts of the group conversation of the selected at least one participant in an application sub-window without including participant posts of the participants that were not selected during the selecting, such that the sub-window represents a portion of the group conversation of the application window;
wherein the second displaying occurs during the first displaying such that the application window and sub-window appear simultaneously on the display.

18. The media of according to claim 17, the operations further comprising:
detecting a request to generate a second group conversation with at least said followed participant; and
generating said second group conversation between said at least one participant and a user of the apparatus.

19. The media of according to claim 18, and wherein said detecting a request to generate comprises:

detecting at least a finger press on a screen location associated with said sub-window; and detecting a drag motion in a direction of an indication of a list of said group conversations.

20. The media according to claim 17, the operations further comprising:

navigating within said participant posts in said application window in accordance with an indicated participant post in said sub-window.

\* \* \* \* \*